March 9, 1948.                L. H. PECHER                2,437,549
                              ARTIFICIAL BAIT
                            Filed June 6, 1945
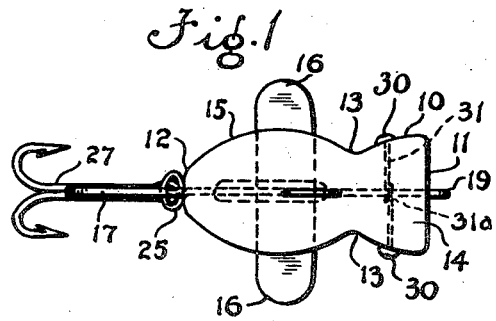
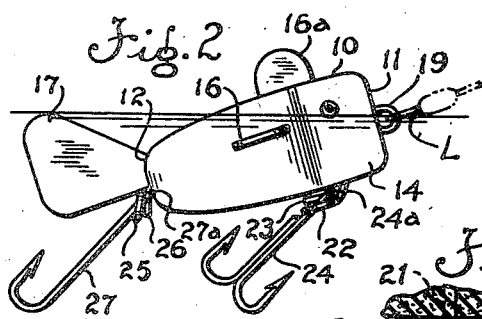
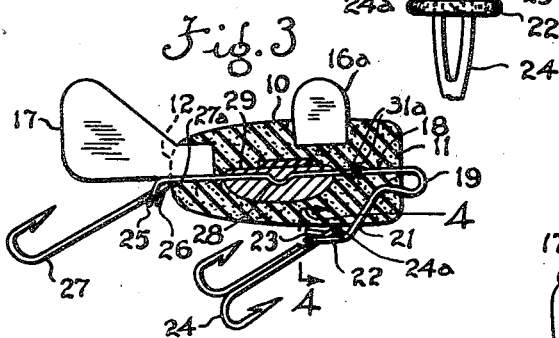
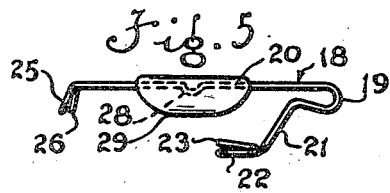
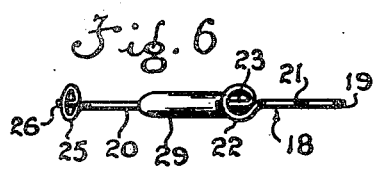
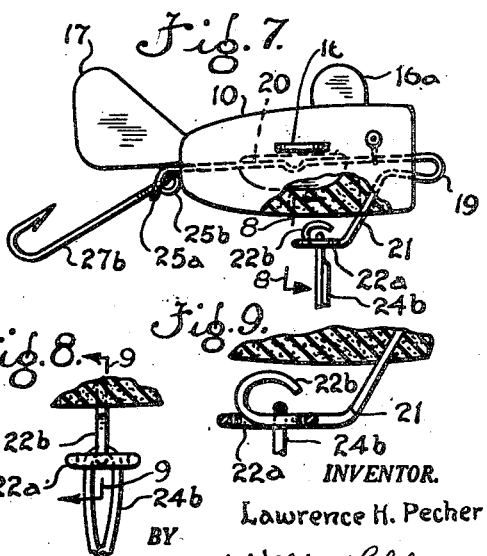
INVENTOR.
Lawrence H. Pecher
BY William Cleland
   Attorney Patented Mar. 9, 1948

2,437,549

UNITED STATES PATENT OFFICE 2,437,549

ARTIFICIAL BAIT

Lawrence H. Pecher, Akron, Ohio

Application June 6, 1945, Serial No. 597,747

8 Claims. (Cl. 43—46)

This invention relates to artificial bait or fishing lures.

A general object of the invention is to provide an artificial fishing lure having a soft sponge rubber or like bait body and having novel means to produce an attractive bait action in the water.

A more particular object of the invention is to provide a simple, inexpensive hook and line attaching unit which may be readily incorporated into a bait body, either by slitting a preformed body of soft sponge rubber or like material or by molding or vulcanizing a bait body of desired material around the attaching unit.

Another object of the invention is to provide a soft sponge rubber lure of the character described, having incorporated therein a unitary hook and line attaching device which will not materially detract from the soft yielding character of the bait body.

Another object of the invention is to provide in an artificial lure a simple but effective hook attaching device, by means of which swinging movement of the hook is limited to a predetermined extent in all directions.

Still another object of the invention is to provide a novel hook attaching device as described in the last paragraph including means by which a hook may be quickly attached or detached at will.

These and other objects of the invention will be manifest from the following brief description and the accompanying drawings.

Of the accompanying drawings:

Figure 1 is a top plan view of an artificial sponge rubber bait or lure embodying the features of the invention.

Figure 2 is a side elevation of the same, but illustrated at an angle to the water line.

Figure 3 is a longitudinal, vertical cross-section through the bait.

Figure 4 is an enlarged fragmentary cross-section, taken substantially on line 4—4 of Figure 3.

Figure 5 is a side elevation of the hook and line attaching unit shown incorporated in a bait body in Figure 3.

Figure 6 is a bottom plan view of Figure 5.

Figure 7 is a side elevation, partly broken away and in section, illustrating still another form of the invention.

Figure 8 is an enlarged fragmentary cross-section, taken substantially on line 8—8 of Figure 7.

Figure 9 is a cross-section, on the same scale, taken on line 9—9 of Figure 8.

In Figures 1 to 6 there is illustrated improved artificial bait structure embodying features of the invention. With particular reference to Figures 1 to 4, the numeral 10 designates an elongate bait body of sponge rubber or like soft resilient material, the same being flat at the head end, as indicated at 11, and tapering rearwardly, both in vertical and transverse section, to a relatively small rounded rear end 12. The body 10 is curved inwardly at 13, 13 at opposite sides intermediate the ends thereof, to simulate a head 14 and relatively larger body part 15 of a small creature or animal (see Figure 1). The body 10 may be coated with luminous paint or other material to make the bait particularly attractive for night fishing. Strips of sheet rubber or like flexible material may be incorporated in the body to provide lateral fins 16, 16 extending in a horizontal plane, a top vertical fin 16a, and a tail 17 extending rearwardly of small end 12 in a vertical plane. The coating of body 10 may be of light color, such as white, and the fins of a contrasting color, such as red, to make the bait very attractive to fish life.

Incorporated into the rubber body 10 may be a line and hook attaching unit 18. As best illustrated in Figures 5 and 6, unit 18 may be formed from a length of wire which is bent intermediate its ends to provide a forward line-attaching loop 19, one end of which is extended rearwardly to provide a longitudinal element 20, and the other end providing member 21, which extends angularly downwardly and rearwardly of said element (see Figure 5).

The end portion of member 21 is formed into an eyelet 22 substantially in a horizontal plane, and the end of the wire is extended from said eyelet to provide a cross-piece 23 diametrically across the eyelet substantially in the plane thereof, but preferably inwardly of the eyelet. The construction is such that the eye portion 24a of a fish hook 24 may be inserted through eyelet 22 to receive the cross-piece 23 therethrough, after which the cross-piece may be sprung toward the eyelet to prevent accidental removal of the hook therefrom. The arrangement is such that hook 24 is free to swing on the cross-piece 23 in all directions, as limited by engagement of the hook with the eyelet 22 to prevent snagging of the hook barbs on the body 10 (see Figures 2, 3 and 4).

The rear end portion of element 20 is similarly bent to provide an eyelet 25 terminating in a cross-piece 26 extending across the same inwardly thereof. The eyelet, however, is in a transverse plane at a downward and rearward angle to the vertical so that a hook 27, having its eye 27a received through eyelet 25 and over cross-piece 26, will normally extend rearwardly at a desired angle as best shown in Figure 3. Swinging movement of hook 27 is similarly limited in all directions by engagement of the same with the eyelet 25.

The element 20 may be kinked at 28 for non-rotatably retaining a weight 29 of lead or other suitable material, pressed or otherwise formed thereon in such a manner that the center of gravity of the bait body will be below the longitudinal axis thereof, for a purpose to be described later.

The unit 18 is adapted to be molded into the sponge rubber body 10, with the hook and line attaching parts outwardly of the body, as by vulcanizing methods, by which said unit will be thoroughly bonded into the rubber, or the unit may be inserted into a slit or slits in a body 10 which has been preformed by molding or trimming methods, the slit or slits being healed up over the unit, as by use of rubber cement or other adhesive material.

Beads 30, 30 simulating life-like eyes may be provided on the head part 15 of the body, by means of wires 31 on the beads extended through the body and looped over the element 20, as indicated at 31a.

The hooks are adapted to be attached to the unit 18, as best shown in Figures 2, 3 and 4, either before or after the unit is incorporated into body 10. A line L is attachable to loop 19 in a suitable manner, as indicated in chain-dotted lines in Figure 2.

The improved bait described above may be used for either casting or trolling. When used for the former purpose the weight 29, being for the most part disposed below the central longitudinal axis of the bait body, will tend to cause the same always to strike the water in upright position, and to assume and maintain substantially the relative angular position shown in Figure 2 when it is drawn through the water. Because of the yielding nature of the body 10, the flexibility of the fins and tail, and the yieldable action between element 20 and member 21, the bait is particularly attractive to repeated bites by a fish until a strike is made. The hooks may be changed either by snapping the eye portions thereof past the ends of cross-pieces of the hook attachments or by temporarily widening the gap between the ends of the cross-pieces and the eyelets to permit more ready passage of the eyes of the hooks therebetween.

Referring to Figures 7, 8 and 9, there is shown a modified form of the invention, which is substantially like that shown in Figures 1 to 6, except that the cross-pieces of the eyelets 22ª and 25ª are extended inwardly in loops 22ᵇ and 25ᵇ in planes at right angles to the planes of the eyelets. The eyelets 22ª and 25ª and loops 22ᵇ and 25ᵇ are so proportioned that the eyes of fish hooks 24ᵇ and 27ᵇ are insertable through the eyelets to receive said loops through the hook eyes (see Figure 9) so that the hooks may be releasably retained on the outer portions of said loops (see Figures 7 and 8). The loops 22ᵇ and 25ᵇ may be closed at their ends to prevent accidental removal of the hooks. Limited swinging action of the hooks is substantially as previously described.

Thus has been provided several illustrative forms of the invention adapted to produce results in accordance with the stated objects.

Other modifications of the invention may be resorted to without departing from the spirit thereof or the scope of the appended claims. For example, it will be readily seen that the unitary line and hook attaching device is adapted to be used with molded solid bait bodies as well as sponge rubber bodies.

What is claimed is:

1. An attachment adapted for use with a fishing lure, comprising a wire member having eyes at the ends thereof and an intermediate loop, at least one said eye having a part thereof extending transversely of the eye and in close proximity to another portion of the eye so as to provide only sufficient space to permit a hook to pass between said part and that portion, whereby a hook having an eye of smaller diameter than the eye of the wire can be passed through the eye and positioned on said transversely extending part.

2. An attachment adapted for use with a fishing lure, comprising a wire member having eyes at the ends thereof and an intermediate loop, at least one said eye having a part thereof extending transversely of the eye and across a portion of the wire constituting the eye, whereby a hook having an eye of smaller diameter than the eye of the wire can be passed through the eye and positioned on said transversely extending part.

3. An attachment adapted for use with a fishing lure, comprising a wire member having eyes at the ends thereof and an intermediate loop, the eyes lying in planes which if extended would intersect each other, at least one said eye having a part thereof extending transversely of the eye and across a portion of the wire constituting the eye, whereby a hook having an eye of smaller diameter than the eye of the wire can be passed through the eye and positioned on said transversely extending part.

4. A fishing lure comprising a bait body having an attaching member incorporated therein, said member being of elongated material and having eyes at the ends thereof and an intermediate loop, at least one said eye having a part thereof extending transversely of the eye and in close proximity to another portion of the eye so as to provide only sufficient space to permit a hook to pass between said part and said portion, whereby a hook having an eye of smaller diameter than said eye of said member can be passed through the eye and positioned on said transversely extending part.

5. A fishing lure comprising a bait body having an attaching member incorporated therein, said member being of elongated material and having eyes at the ends thereof and an intermediate loop, at least one said eye having a part thereof extending transversely of the eye and across a portion of the wire constituting the eye, whereby a hook having an eye of smaller diameter than said eye of said member can be passed through the eye and positioned on said transversely extending part.

6. A fishing lure comprising a bait body having an attaching member incorporated therein, said member being of elongated material and having eyes at the ends thereof and an intermediate loop, the eyes lying in planes which if extended would intersect each other, at least one said eye having a part thereof extending transversely of the eye and in close proximity to another portion of the eye so as to provide only sufficient space to permit a hook to pass between said part and said portion, whereby a hook having an eye of smaller diameter than said eye of said member can be passed through the eye and positioned on said transversely extending part.

7. An attachment adapted for use with a fishing lure, comprising a wire member having eyes at the ends thereof and an intermediate loop, at least one said eye having a part thereof extending transversely of the eye and in close proximity to another portion of the eye so as to provide only sufficient space to permit a hook to pass between said part and that portion, whereby a hook having an eye of smaller diameter than the eye of the wire can be passed through the eye and positioned on said transversely extending part, said part terminating in a loop in a plane at an angle to the plane of the eyelet.

8. An attachment adapted for use with a fishing lure, comprising a wire member having eyes at the ends thereof and an intermediate loop, at least one said eye having a part thereof extending transversely of the eye and in close proximity to another portion of the eye so as to provide only sufficient space to permit a hook to pass between said part and that portion, whereby a hook having an eye of smaller diameter than the eye of the wire can be passed through the eye and positioned on said transversely extending part, said part terminating in a loop in a plane at an angle to the plane of the eyelet, said terminating loop being proportioned to be received through said hook eye.

LAWRENCE H. PECHER.

REFERENCES CITED

The following references are of record in the file of this patent:

UNITED STATES PATENTS

| Number | Name | Date |
| --- | --- | --- |
| 1,173,949 | Gilliland | Feb. 29, 1916 |
| 1,569,993 | MacLeod | Jan. 19, 1926 |
| 1,627,455 | Peterson | May 3, 1927 |
| 1,931,932 | Myers et al. | Oct. 24, 1933 |
| 1,974,381 | Swanson et al. | Sept. 18, 1934 |